United States Patent [19]
Heinemann et al.

[11] Patent Number: 6,028,235
[45] Date of Patent: Feb. 22, 2000

[54] GAS HYDRATE REGASSIFICATION METHOD AND APPARATUS USING STEAM OR OTHER HEATED GAS OR LIQUID

[75] Inventors: Robert Frederick Heinemann; David Da-Teh Huang; Jinping Long, all of Plano, Tex.; Roland Bernard Saeger, Runnemede, N.J.

[73] Assignee: Mobil Oil Corporation, Fairfax, Va.

[21] Appl. No.: 08/950,247

[22] Filed: Oct. 14, 1997

[51] Int. Cl.[7] .............................. C07C 7/20; F17C 62/542
[52] U.S. Cl. .......................... 585/15; 585/800; 585/801; 62/54.3; 62/45.1; 62/54.2
[58] Field of Search ............................ 585/15, 800, 801; 62/54.3, 45.1, 54.2

[56] References Cited

U.S. PATENT DOCUMENTS

| | | | |
|---|---|---|---|
| 2,270,016 | 1/1942 | Benesh | 48/190 |
| 2,356,407 | 8/1944 | Hutchinson | 48/190 |
| 2,375,559 | 5/1945 | Hutchinson et al. | 48/190 |
| 2,683,972 | 7/1954 | Atkinson | 48/128 |
| 2,904,511 | 9/1959 | Donath et al. | 210/59 |
| 3,170,870 | 2/1965 | Bachman | 210/59 |
| 3,514,274 | 5/1970 | Cahn et al. | 48/190 |
| 3,856,492 | 12/1974 | Klass | 62/58 |
| 3,888,434 | 6/1975 | Chersky et al. | 243/38 |
| 3,954,921 | 5/1976 | Yoshida et al. | 261/116 |
| 3,975,167 | 8/1976 | Nierman | 48/190 |
| 4,696,338 | 9/1987 | Jensen et al. | 165/1 |
| 4,915,176 | 4/1990 | Sugier et al. | 166/371 |
| 4,920,752 | 5/1990 | Ehrsam | 62/46.1 |
| 4,930,319 | 6/1990 | Bee et al. | 62/69 |
| 5,473,904 | 12/1995 | Guo et al. | 62/46.1 |
| 5,536,893 | 7/1996 | Gudmundsson | 585/15 |
| 5,562,891 | 10/1996 | Spencer et al. | 423/437 |
| 5,713,416 | 2/1998 | Chatterji et al. | 166/263 |
| 5,806,316 | 9/1998 | Avakov et al. | 60/644 |

FOREIGN PATENT DOCUMENTS

WO93/01153  1/1993  WIPO.

OTHER PUBLICATIONS

W.P. Gee, et al., "The Solvent Dewaxing Process," *Refiner & Natural Gasoline Manufacturer*, vol. 15, No. 6 (1936), pp. 205–209–Jun., 1936.

B. Miller, et al., "Hydrate Storage of Natural Gas," *American Gas Association Monthly*, vol. 28, No. 2 (1946), pp. 63–67, 92 Feb. 1946.

D. Katz, et al., *Handbook of Natural Gas Engineering*, McGraw–Hill, New York (1959) pp. 189–221–no month.

H.C. Kim, "Kinetics of Methane Hydrate Decomposition," *Chemical Engineering Science*, vol. 42, No. 7 (1987), pp. 1645–1653–no month.

A.A. Trofimuk, et al., "The Dynamics of the Zone of Hydrate Formation and its Effect on the Temperature Regime of the Cryolithozone," *Soviet Geology and Geophysics*, vol. 27, No. 11 (1987), pp. 1–7–no month.

I. Ridley, et al., "Gas Hydrates Keep Energy on Ice," *New Scientist*, No. 1601 (1988), pp. 53–58–Feb. 1988.

(List continued on next page.)

*Primary Examiner*—Walter D. Griffin
*Assistant Examiner*—Nadine Preisch
*Attorney, Agent, or Firm*—Robert B. Furr, Jr.; Malcolm D. Keen

[57] ABSTRACT

A method and apparatus for safely, conveniently, and inexpensively liberating gas from gas hydrates includes the use of a device, provided adjacent to or in the bulk gas hydrates, for exposing the gas hydrates to heat from a gas or liquid (preferably steam). The gas hydrates can be directly exposed to the gas or liquid or indirectly exposed through a thermally conductive coil or channel. The heat from the gas or liquid dissociates the gas hydrates into the corresponding gas component and water component. After liberation, the gas component can be collected for further storage, transport, or use. The apparatus further includes a mechanism for moving at least a portion of the gas or liquid through the device for exposing the gas hydrates to heat. The device for exposing the gas hydrates to heat also can be movable, so it can be maintained in close proximity to or in contact with the gas hydrates for continued efficient gasification of the hydrates.

51 Claims, 2 Drawing Sheets

OTHER PUBLICATIONS

Y.P. Handa, "A Calorimetric Study of Naturally Occuring Gas Hydrates," *Industrial & Engineering Chemistry Research*, vol. 27, No. 5 (1988), pp. 872–874–May 1988.

L.F. Smirnov, "New Technologies Using Gas Hydrates," *Theoretical Foundations of Chemical Engineering*, vol. 23, No. 6 (1990), pp. 514–526 (Russian language original published at Teor. Osn. Khim. Tekhnol. V23(6), 808–822 (1989))–no month.

E.D. Ershov, et al., "Experimental Investigations of the Microstructure of Agglomerate of Ice and Methane Hydrate," *Soviet Engineering Geology*, vol. 3 (1990), pp. 32–37–no month.

E.D. Sloan, Gas Research Institute, Topical Report "The State–of–the–Art of Hydrates as Related to the Natural Gas Industry," GRI–91/0302, 1992 Jun. 1992.

E.D. Ershov, et al., Experimental Research on Gas Hydrate Decomposition in Frozen Rocks, *Cold Regions Science and Technology*, vol. 20 (1992), pp. 147–156–no month.

P. Englezos, "Clathrate Hydrates," *Industrial & Engineering Chemical Research*, vol. 32 (1993), pp. 1251–1274–no month.

J.S. Gudmundsson, "Storing Natural Gas as Frozen Hydrate," *SPE Production & Facilities*, vol. 9, No. 1 (1994), pp. 69–73–Feb. 1994.

R.D. Malone, "Gas Hydrate Geology and Geography," International Conference on Natural Gas Hydrates, Annals of the New York Academy of Sciences, vol. 715, pp. 225–231 1994–no month.

K.A. Kvenvolden, "Natural Gas Hydrate Occurrence and Issues," International Conference on Natural Gas Hydrates, Annals of New York Academy of Sciences, vol. 715, pp. 232–246–1994 no month.

J.S. Gudmundsson, et al., "Transport of Natural Gas as Frozen Hydrate," Proceedings of the Fifth International Offshore and Polar Engineering Conference, vol. I, The Hague, Netherlands, Jun. 1995, pp. 282–288.

"Natural Gas Transport as Hydrates 25% Below Cost of LNG," *Offshore*, Nov. 1995, p. 26.

J. Long, "Gas Hydrate Formation Mechanism and Kinetic Inhibition," Ph.D. Dissertation, 1994, Colorado School of Mines, Golden, Colorado–Apr. 1994.

MS Peters et al., "Plant Design and Economics for Chemical Engineers", McGraw Hill, 1976, pp. 575–586–no month.

GAS HYDRATE REGASSIFICATION METHOD AND APPARATUS USING STEAM OR OTHER HEATED GAS OR LIQUID

FIELD OF THE INVENTION

This invention relates to an apparatus and method for storing and regassifying gas hydrates. The invention includes a means, provided adjacent to or in the bulk gas hydrates, for exposing the gas hydrates to heat from a gas or liquid source (preferably steam). The gas hydrates can be directly exposed to the gas or liquid or indirectly exposed through a thermally conductive coil, pipe, or channel. Heat from the gas or liquid transfers to the gas hydrates and dissociates them into the corresponding gas component and water component. After liberation, the gas component can be collected for further storage, transport, or use.

BACKGROUND OF THE INVENTION

Gas hydrates have been known for many years. These hydrates are inclusion compounds wherein various light hydrocarbon gases or other gases, such as natural gas, associated natural gas, methane, ethane, propane, butane, carbon dioxide, hydrogen sulfide, nitrogen, and combinations thereof, physically react with water at elevated pressures and low temperatures. The gas becomes included or entrapped within the extended solid water lattice network which includes hydrogen bonded water molecules. The hydrate structure is stable due to weak van der Waals' forces between the gas and water molecules and hydrogen bonding between water molecules within the lattice structure.

An exemplary, non-stoichiometric reaction equation for the formation of natural gas hydrates is as follows:

$$CH_4(g) + mH_2O(l) \rightarrow CH_4(H_2O)_m(s).$$

In this equation, the value "m" typically is 4 to 6, and the heat of formation ($\Delta H_f$) is $-410$ kJ/kg hydrate for methane hydrate, which is approximately 25% higher than the heat of fusion of water. The reverse reaction, exploited during regassification, is endothermic. Because gas hydrates are solids that form at a gas-water interface, the formation and regassification reactions are mass-transfer limited.

At least two different hydrate crystalline structures are known, each of which is a clathrate crystalline structure. A clathrate hydrate unit crystal of structure I includes two tetrakaidecahedron cavities and six dodecahedron cavities for every 46 water molecules. A clathrate hydrate unit crystal of structure II contains eight large hexakaidecahedron cavities and 16 dodecahedron cavities for every 136 water molecules. A relatively large volume of gas can be entrapped under pressure in these cavities. For example, it has been determined that natural gas hydrates can contain as much as 180 standard cubic feet of gas per cubic foot of the solid natural gas hydrates.

Early on, gas hydrates were considered an industrial nuisance. Petroleum and natural gas production facilities often are located in cold environments, where the product is located in deep underground or underwater wells. When tapping these wells, all of the necessary conditions and ingredients are present for producing gas hydrates—i.e., light hydrocarbon gases and water are present, the temperature is low, and the pressure is high. Therefore, gas hydrates often would be produced spontaneously in the drilling and transmission pipes and equipment when an oil or natural gas well was tapped. Because gas hydrates are solid materials that do not readily flow in concentrated slurries or in solid form, when they are spontaneously produced in oil or natural gas production, they tend to clog the equipment, pipes, and channels in the production and transmission systems. These disadvantageous properties of gas hydrates spawned much research into methods for inhibiting hydrate formation and eliminating this nuisance. See, for example, D. Katz, et al., *Handbook of Natural Gas,* McGraw-Hill, New York (1959) pp. 189–221; E. D. Sloan, Jr., *Clathrate Hydrates of Natural Gases,* Marcel Dekker, Inc. (1991). These documents are entirely incorporated herein by reference.

But, because of the relatively high volume of gas that potentially can be stored in gas hydrates, eventually researchers began to look at this "nuisance" as a possible method for safely and cost effectively storing and/or transporting gases. See B. Miller, et al., *Am. Gas. Assoc. Mon.* Vol. 28, No. 2 (1946), pg. 63. This document is entirely incorporated herein by reference. Several researchers and patentees have described methods of producing gas hydrates. See, for example, U.S. Pat. No. 3,514,274 to Cahn, et al., which document is entirely incorporated herein by reference.

While there is extensive documentation relating to gas hydrate production processes, less attention is paid in the literature to devices and methods for storing and regassifying the hydrates. These aspects of gas hydrate production also are important. If the gas hydrates cannot be conveniently, reliably, and inexpensively stored for extended time periods, the production thereof is of limited usefulness. Additionally, if the gas hydrates cannot be conveniently and controllably regassified, there is little or no point to producing and storing the hydrates.

Hutchinson, et al., U.S. Pat. No. 2,375,559 (which patent is entirely incorporated herein by reference), describe a process for hydrating hydrocarbon gases and storing the produced hydrates in storage tanks. Few details are provided in Hutchinson relating to the manner in which these stored hydrates are regassified.

U.S. Pat. No. 2,904,511 to Donath illustrates a water desalination apparatus that produces desalinated water from salt water by forming gas hydrates. Because this patent relates primarily to a desalination method, hydrate storage and gas recovery is not a concern of Donath. Rather, the hydrates are passed immediately into a hydrate decomposition vessel where the gas is liberated from the relatively desalinated water present in the hydrate. This Donath patent also is entirely incorporated herein by reference.

Gudmundsson also describes various systems for producing gas hydrates. See, for example, U.S. Pat. No. 5,536,893; WO Patent Publication No. 93/01153; "Transport of Natural Gas as Frozen Hydrate," ISOPE Conference Proceedings, VI, The Hague, Netherlands, June 1995; and "Storing Natural Gas as Frozen Hydrate," SPE Production & Facilities, February 1994. These documents each are entirely incorporated herein by reference. U.S. Pat. No. 5,536,893 describes agglomerating the gas hydrates into solid blocks suitable for long term storage at atmospheric pressure and at a temperature below 0 to $-15°$ C. Few details are provided concerning the method and apparatus used for hydrate storage and regassification.

Gudmundsson discloses storage of gas hydrates under "metastable" conditions, i.e., conditions under which one would normally expect the hydrates to be unstable and decompose. Under these relatively mild metastable conditions (5 to 20° F. and ambient pressure), natural gas hydrates dissociate sufficiently slowly to remain intact for periods of time suitable to ocean transport or large-scale storage (e.g., for 10 days or more). This metastability phenomenon is attributed to spontaneous regassification of the outer surface of a macroscopic hydrate sample. Because the hydrate regassification process is endothermic, once the outer surface of the hydrate sample dissociates, auto-refrigeration freezes the dissociated water to create an ice shell that significantly insulates the bulk hydrates and attenuates the mass transfer rate of gas from within the interior of the sample.

Additionally, gas hydrates are effective insulators (thermal conductivity "k" of about 0.5 W/m K for hydrates, as compared to a thermal conductivity "k" of 2 for ice). This insulative property helps keep bulk gas hydrates from dissociating too rapidly. The metastability and the insulative properties of gas hydrates allow them to remain stable under relatively mild conditions after they are initially produced.

With regard to hydrate dissociation methods, Rogers, et al., "Hydrates for Storage of Natural Gas," Mississippi State University, Proceedings of the Second International Conference on Natural Gas Hydrates, June 2–6, 1996, Toulouse, France, describe an ultrasonic dissociation concept that was intended for use in vehicular applications.

Traditionally, hydrate-forming gases, such as natural gas, associated natural gas, methane, ethane, propane, butane, carbon dioxide, nitrogen, and hydrogen sulfide, have been stored under high pressures. Liquefied-natural gas and liquefied propane are examples of this type of storage system. Because of the presence of high pressure cylinders, storage of gases under high pressures and liquefied conditions presents a significant safety issue and is very expensive.

SUMMARY OF THE INVENTION

It is an object of this invention to provide a gas hydrate storage reservoir and a gas hydrate regassification method that allows one to safely, conveniently, controllably, and inexpensively store and regassify the gas hydrates and remove the gas and water products from the storage reservoir. The invention takes advantage of the favorable properties of gas hydrates and avoids the drawbacks associated with storing gases in a pressurized and/or liquefied condition.

To accomplish these objectives, the invention includes an apparatus for liberating gas from a gas hydrate. This apparatus includes a means for exposing gas hydrates to heat from a gas or liquid, i.e., a fluid. This heat dissociates the gas hydrates into the corresponding gas component and water component. The apparatus for liberating gas from gas hydrates further includes a means for moving at least a portion of the gas or liquid through the means for exposing. Preferably, this apparatus for liberating the gas from gas hydrates is provided at least partially within a chamber that holds or stores the gas hydrates.

While any suitable gas or liquid can be used to heat the gas hydrates in the apparatus according to the invention, steam is the preferred material, particularly for certain embodiments of the invention. For example, in some embodiments of the invention, the means for exposing includes at least one opening for ejecting at least a portion of the gas or liquid from the means for exposing and into the stored hydrates. In this instance, it is preferable if the gas or liquid is water (i.e., steam or liquid water) so that it will not contaminate the hydrates.

When the means for exposing includes one or more openings for ejecting some of the gas or liquid into the hydrates, if desired, the opening(s) can include a nozzle for ejecting the gas or liquid under pressure into the hydrates.

The means for exposing the gas hydrates to heat according to the invention preferably includes at least one coil or channel through which at least a portion of the gas or liquid is moved by the means for moving. This coil or channel can be stationary or it can be movable with respect to the gas hydrates and/or the chamber in which the gas hydrates are held. The coil or channel can be mounted on or held by a substrate. Any suitable manner for holding or mounting the coil or channel on the substrate can be used without departing from the invention. For example, the coil or channel can be fixed to the substrate by a mechanical mounting or an adhesive. As another example, the coil or channel can be integrally formed within the substrate. The substrate also can be stationary or movable with respect to the gas hydrates and/or the chamber for holding the gas hydrates.

Additionally, the substrate can include holes defined therein to allow at least a portion of the liberated gas component to pass through the substrate so it can be collected (e.g., via vents or other suitable gas collection means).

The invention further relates to a method for liberating gas from gas hydrates. In this method, a gas or liquid, preferably steam, is passed through a coil or channel that extends adjacent to or into gas hydrates. Through this action, the gas hydrates are exposed to heat from the gas or liquid, which causes the hydrates to dissociate into a gas component and a water component. As noted above, at least a portion of the gas or liquid from the coil or channel can be injected directly into the gas hydrates. The gas or liquid can be continuously moved through the coil or channel, or it can be moved periodically, depending on the needs of the user. If it is necessary to rapidly cease hydrate regassification, a cold gas or liquid source also can be moved through the coil or channel of the apparatus according to the invention.

In one advantageous embodiment, the method according to the invention provides a movable coil or channel through which the gas or liquid is passed. Through this movement, the coil or channel is maintained in close proximity to the gas hydrates. This provides very efficient and effective heat exchange between the heated gas or liquid and the hydrates to be dissociated.

Any suitable manner for introducing the gas or liquid into the coil or channel can be provided without departing from the invention. For example, the gas or liquid can enter a first end of the coil or channel, and the gas or liquid or a condensate of the gas can be removed at a second end of the coil or channel. Alternatively, the gas or liquid can enter both a first end and a second end of the coil or channel and exit the coil or channel through at least one opening provided therein. Any other suitable arrangement can be used without departing from the invention.

After liberation, the gas component can be collected for further storage, transport, or use. This collected gas can be put to any suitable use. Additionally, the liberated water component can be removed from the hydrates and further used (e.g., recirculated) in the process and apparatus of the invention.

Accordingly, as described above, the invention provides a convenient, efficient, and effective method and apparatus for liberating gas from gas hydrates. This liberation can be accomplished by either directly or indirectly contacting the gas hydrates with the gas or liquid material that forms the source of the heat for dissociation.

BRIEF DESCRIPTION OF THE DRAWINGS

The advantageous aspects of the invention will be more fully understood and appreciated when considered in conjunction with the following detailed description and the attached figures, wherein.

DETAILED DESCRIPTION OF THE INVENTION

Figure 1:
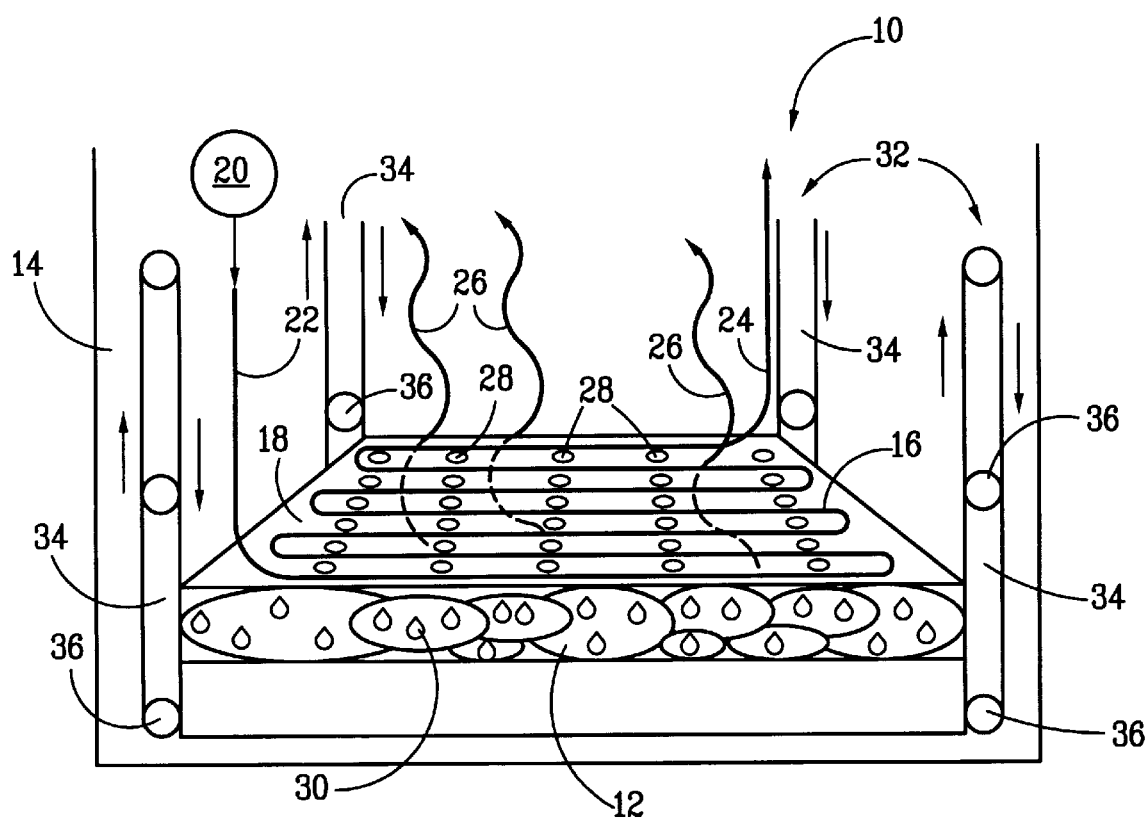
FIG. 1 includes a simplified schematic diagram of a first embodiment of the apparatus according to the invention.

This invention relates to an apparatus and method for liberating gas from gas hydrates. As its main constituent parts, the invention includes a suitable means for exposing gas hydrates to heat from a gas or liquid source and a means for moving at least a portion of the gas or liquid through the means for exposing. Heat energy from the gas or liquid warms the gas hydrates and drives the endothermic process that causes the hydrates to dissociate into their corresponding gas component and water component. The gas liberating apparatus according to the invention, if desired, can be used directly inside a storage chamber for storing large-scale accumulations of gas hydrates.

The apparatus and method according to the invention can take on many different forms. For example, the means for exposing the gas hydrates to heat from the gas or liquid can be movable or stationary. Furthermore, the gas or liquid for heating the gas hydrates can directly contact the gas hydrates, or the contact can be indirect, through at least one thermally conductive coil or channel. Additionally, the means for exposing can be adjacent to but not directly in contact with the gas hydrates, as long as the means for exposing is arranged in a heat exchange relationship with the hydrates.

This invention also can be used as an auxiliary heating means in conjunction with another primary means for regassifying the gas hydrates. For example, this invention can be used in conjunction with the gas hydrate storage reservoir described in U.S. patent appln. Ser. No. 08/950,249, filed Oct. 14, 1997 in the names of inventors Roland B. Saeger, David D. Huang, Jinping Long, and Robert F. Heinemann entitled "Gas Hydrate Storage Reservoir." This application is entirely incorporated herein by reference. As described in this related application, the primary heat source for liberating the gas component from the gas hydrates is heat from the sun.

Any suitable hydrate-forming gas can be used in the method and apparatus according to this invention. Examples of suitable hydrate-forming gases include natural gas, associated natural gas, methane, ethane, propane, butane, carbon dioxide, nitrogen, and hydrogen sulfide, as well as combinations of these gases. The hydrates can be produced by any suitable process known in the art, such as those processes described in the various documents noted above. Additionally, the gas hydrates can be produced by the process described in U.S. patent appln. Ser. No. 08/950,246, filed Oct. 14, 1997 in the names of inventors Jinping Long, Roland B. Saeger, David D. Huang, and Robert F. Heinemann entitled "Method and Apparatus for Producing Gas Hydrates." This patent application also is entirely incorporated herein by reference.

As noted above, any suitable gas or liquid can be used to provide the heat source without departing from the invention. In the following more detailed description of the invention, for simplicity, this patent application often refers specifically to steam as this gas or liquid. Those skilled in the art, however, will recognize that the steam, as used in these preferred embodiments, could be replaced with any other suitable liquid or gas material without departing from the invention.

Additionally, this application often refers to the gas or liquid in the means for exposing as being "heated." By this term, as used in this application, applicants mean that the gas or liquid is at a temperature so that it transfers heat to the hydrates and dissociates them, i.e., the gas or liquid is at a higher temperature than the hydrates. It is not necessary that the gas or liquid be heated above normal ambient temperatures, although such heating also is within the scope of the invention.

A first embodiment of an apparatus 10 according to the invention for liberating the gas component from gas hydrates is schematically illustrated in FIG. 1. Bulk gas hydrates 12 are stored within a storage chamber 14, which could be, for example, above-ground, in-ground, the hold of a marine vessel, etc. The apparatus for liberating the gas hydrates 10 is provided above the surface of the stored bulk hydrates 12. This apparatus 10 includes at least one steam coil 16 appropriately held on a substrate 18. For example, the coil 16 can be fixed to the substrate 18 by adhesives, hardware, or any other suitable method. Additionally, the coil 16 can be held within or integrally formed as a channel in the substrate 18. The substrate 18 and coil 16 can be in direct contact with the surface of the stored bulk hydrates 12, or they can be adjacent to but spaced apart from the hydrates 12.

As an alternative embodiment, the substrate 18 and/or the coil 16 can be formed at the bottom of the storage chamber 14, wherein the hydrates 12 are piled atop the substrate 18. In fact, the bottom wall of the chamber 14 could actually function as the substrate 18 without departing from the invention.

The substrate 18 can be made from any suitable material, and preferably is made from a highly thermally conductive material (e.g., metal), so that the heat energy from the steam passing through the coil 16 is relatively uniformly distributed to the surface of the bulk gas hydrates 12. Steam from an appropriate source 20 enters a first end 22 of the coil 16 and makes its way to the surface of the substrate 18. The coil 16 provides a meandering path for the steam along the surface of the substrate so that heat is widely distributed over the surface of the hydrates 12. The steam and/or condensate (e.g., condensed water) is removed from a second end 24 of the coil using gravity, a pump, or another suitable device. The removed steam and/or condensate can be reheated and recirculated for use as at least a portion of the steam source 20, or it can be properly disposed or transported for other use.

Any suitable steam source 20 (or other gas or liquid source) can be used without departing from the invention. For instance, a dedicated boiler could be provided for producing steam. As another alternative, this gas liberation apparatus 10 can be integrated with existing refinery, chemical, or power generation plant systems.

The heat from the circulated steam conducts through the coil 16 and the substrate 18 to heat the gas hydrates 12 located at the surface near the substrate 18. As the gas hydrates 12 heat, the hydrates 12 decompose and the gas component 26 is liberated. The liberated gas component 26, as it rises, can pass around the substrate 18. Optionally, the substrate 18 can include holes 28 through which at least a portion of the liberated gas component 26 can pass as it rises. This liberated gas component 26 can be collected in any suitable manner known in the art. For example, because the gas component 26 will rise, vents can be located at the top of the storage chamber 14 for collecting the gas. The gas then can be transported for further processing (e.g., dewatering) or for any desired use, using any suitable transport means known in the art (e.g., pipeline, pressurized cylinder, etc.).

Dissociation of the gas hydrates 12 and liberation of the gas component 26 also liberates a water component 30. This water component, which is heavier than the hydrates (methane hydrate has a specific gravity of about 0.92) falls under the force of gravity to the bottom of the storage chamber 14, where it can be collected by any suitable means known in the art. For example, it can be collected in a drain or sump located at the floor of the chamber 14 for removal, recirculation, storage, treatment, and/or disposal.

During heating, the gas hydrates 12 at the surface near the substrate 18 are decomposed. Therefore, the total amount of bulk hydrates 12 will decrease, and the size of the bulk hydrate pile will shrink. As the bulk hydrate pile shrinks, the surface of the bulk hydrates 12 will move away from the bottom surface of the substrate 18 and the coil 16. To maintain a high level of heat exchange between the gas hydrates 12 and the coil 16 and substrate 18, the substrate 18 can be movably mounted within the chamber 14. Any suitable moving means 32 could be used without departing from the invention. In the illustrated embodiment, guides 34 are provided within the chamber 14, and pulleys 36 are provided for moving the substrate 18 up and down within the chamber 14. As another example, the substrate 18 could be suspended from a belt, chain, rods, etc. and moved up and down by an appropriate mechanical moving device. As another alternative, a rack and pinion or other gear mechanism can be provided to move the substrate 18 and coil 16 in the chamber 14.

Of course, the moving means 32 can be manually operated or it can be mechanically or electrically operated, e.g., by a motor or other suitable moving device. In one embodiment of the invention, as the hydrates 12 are dissociated and the bulk hydrate pile becomes smaller, the substrate 18 will move downward with the surface of the hydrates under the force of gravity. Additionally, the moving means 32 can be structured so that the entire coil 16 and substrate 18 can be removed from the chamber 14 for any purpose, such as for filling the chamber 14 with hydrates, for repairs, or for routine maintenance.

Figure 2:
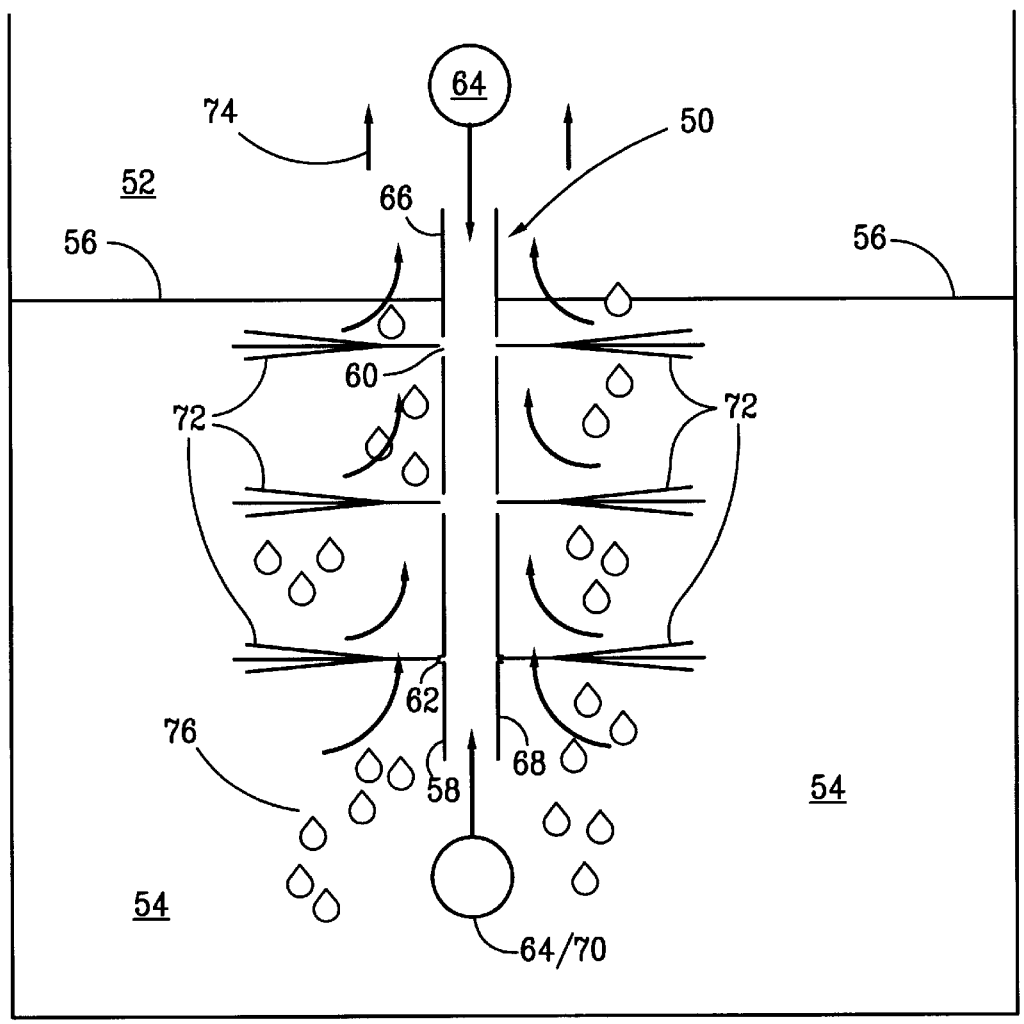
FIG. 2 includes a simplified schematic diagram of a second embodiment of the apparatus according to the invention.

The embodiment of the invention illustrated in FIG. 1 does not allow direct contact of the gas or liquid heat source with the gas hydrates. Rather, the hydrates are exposed indirectly to the heat source through the coil 16 and substrate 18. Complete separation of the gas hydrates and the gas or liquid heat source, however, is not required. An example of an embodiment of the invention where the gas hydrates directly contact the heat source is shown in FIG. 2. Additionally, the embodiment of the invention illustrated in FIG. 2 differs from the embodiment shown in FIG. 1 in that the coil or channel for transporting the heated gas or liquid can be stationary with respect to the chamber.

The gas liberating apparatus of the second embodiment of the invention is shown generally at reference number 50 in FIG. 2. One or more gas liberating apparatuses 50 can be included within a storage chamber 52 of a suitable storage reservoir for storing gas hydrates 54, such as that described above. In FIG. 2, the surface of the hydrate mass is shown at reference number 56.

To transfer heat to the gas hydrate mass 54, each gas liberating apparatus 50 includes a pipe, manifold, or other suitable gas or fluid channel 58 through which the heated gas or fluid (preferably steam) flows. The pipe 58 can be made of any suitable material such as metal, polyvinyl chloride, or other suitable polymeric material without departing from the invention. Pipes 58 made of a thermally conductive material allow for more efficient heat transfer between the heated gas or fluid and the bulk hydrates 54. Pipes 58 made of a thermally non-conductive material, however, also can be used, because such pipes 58 allow for a more controlled introduction of heat into the gas hydrates 54.

The pipe preferably contains one or more openings 60 which will allow at least a portion of the steam flowing through the pipe 58 to leave the pipe and enter into direct contact with the bulk hydrates 54. These openings can include high-velocity stream jets, ejectors, or nozzles 62, if desired, for ejecting the steam under high pressure into the hydrates 54.

In use, steam, from an appropriate steam source 64 (such as those described above), is introduced into a first end 66 of the pipe 58. Additionally, in the illustrated embodiment, to increase pressure, steam also is introduced into a second end 68 of the pipe 58. The steam introduced into the second end 68 can come from the first steam source 64 or from an independent steam source 70. Because of the pressure in the pipe 58, steam is forced out of the openings 60 and/or nozzles 62, directly into the bulk hydrates 54. The ejected steam forms steam lances 72 which extend from the pipe 58 and into the surrounding gas hydrates 54 to heat them. This heating causes the gas hydrates 54 to dissociate or decompose into a gas component 74 and a water component 76. The gas component 74 can be collected, e.g., in vents as described above, for further storage, transport, or use. The water component 76 is removed from the hydrates 54 by gravity. A suitable device (e.g., drain or sump) can be provided for collecting the water component 76 and removing it from the chamber 52 for further use, recycle, treatment, storage, and/or disposal.

Steam need not be admitted into the pipe 58 through both the first end 66 and the second end 68 thereof. Rather, increased steam pressure in the pipe 58 can be built up by any appropriate means while still maintaining the steam flow in a single direction through the pipe 58 (e.g., steam entering at the first end 66 and exiting at the second end 68). For example, the steam outlet at the second end 68 could be made smaller than the steam inlet at the first end 66, thereby increasing the steam pressure in the pipe 58.

The openings 60 or nozzles 62 in the pipe 58 also are not required and/or they can be selectively opened or closed by the user. If the pipe 58 is made from a thermally conductive material, adequate heat transfer to dissociate the hydrates can be accomplished through the walls of the pipe 58. In this embodiment, steam would enter one end of the pipe 58 and exit through a second end (e.g., flow from the first end 66 to the second end 68 or vice versa).

The pipe or pipes 58 can be located at permanently fixed positions within the chamber 52. Additionally, without departing from the invention, the pipe or pipes 58 could be movably held in the chamber 52 so they can be moved to different areas within the chamber 52. For example, a series of pipes 58 could be held on a rotatable and/or translatable support or carousel so that movement within the chamber 52 is possible. Additionally, the pipes 58 can be supported so that they can individually be pulled up from one location within the chamber 52 and inserted into the hydrates 54 at another location within the chamber 52. Utilizing these alternative features of the invention, as the hydrates are dissociated in the immediate vicinity of the pipe 58, the pipe 58 can be moved to another area containing the hydrates 58. This ability to move improves the efficiency and effectiveness of the apparatus 50. All of this movement can be accomplished manually, mechanically, electrically, or through a combination of these methods.

If the pipes, manifolds, or channels 58 are to be moved, it is helpful if the hydrates are granular, to accommodate the interpenetrating pipes, manifolds, or channels 58.

Additionally, the pipes, manifolds, or channels 58 can be located at any convenient location within the interior of the hydrate storage chamber 52. For example, they can be mounted on the top, bottom, sides, or circumference of the chamber 52. They also can extend through a central area in the chamber 52.

Accordingly, this invention provides an efficient, effective, and convenient method and apparatus for liberating a stored gas component from gas hydrates. The method and apparatus can be used in a continuous process for recovering the gas and water components from a hydrate sample, or they can be used as necessary, when gas flow is demanded by the user. Additionally, the apparatus according to the invention also can be set up for automated operation.

In describing this invention, Applicants have set forth certain theories and mechanisms in an effort to explain how and why the invention works in the manner in which it works. These theories and mechanisms are set forth for information purposes only. Applicants are not to be bound by any specific physical, chemical, or mechanical theories or mechanisms of operation.

While the invention has been described in terms of various preferred embodiments using specific examples, those skilled in the art will recognize that various changes and modifications can be made without departing from the spirit and scope of the invention, as defined in the appended claims.

We claim:

1. An apparatus for liberating gas from a gas hydrate, comprising:

means for exposing gas hydrates to heat from a fluid to dissociate the gas hydrates into a gas component and a water component; wherein the means for exposing gas hydrates to heat is movable with respect to gas hydrates and optionally adapted for ejecting the fluid into the gas hydrates; and means for moving at lest a portion of the fluid through the means for exposing.

2. An apparatus according to claim 1, wherein the fluid includes steam.

3. An apparatus according to claim 1, wherein the means for exposing includes at least one opening for ejecting into the gas hydrates at least a portion of the fluid from the means for exposing.

4. An apparatus according to claim 3, wherein a nozzle is included in the opening for ejecting at least a portion of the fluid.

5. An apparatus according to claim 1, wherein the means for exposing includes at least one coil or channel through which at least a portion of the fluid is moved by the means for moving.

6. An apparatus according to claim 5, wherein the coil or channel and the gas hydrates are movable with respect to one another.

7. An apparatus according to claim 5, further including a substrate for holding the coil or channel.

8. An apparatus according to claim 7, wherein the substrate is movably supported with respect to the gas hydrates.

9. An apparatus for holding gas hydrates and liberating gas from the gas hydrates, comprising:

means for defining a chamber for holding gas hydrates; and means for exposing the gas hydrates to heat from a fluid to dissociate the gas hydrates into a gas component and a water component, wherein the means for exposing is at least partially provided within the means for defining a chamber and wherein the means for exposing gas hydrates to heat is movable with respect to gas hydrates and optionally adapted for ejecting the fluid into the gas hydrates.

10. An apparatus according to claim 9, wherein the fluid includes steam.

11. An apparatus according to claim 9, further including means for moving at least a portion of the fluid through the means for exposing.

12. An apparatus according to claim 9, wherein the means for exposing includes at least one opening for ejecting into the gas hydrate at least a portion of the fluid from the means for exposing.

13. An apparatus according to claim 12, wherein a nozzle is included in the opening for ejecting the fluid.

14. An apparatus according to claim 9, wherein the means for exposing includes at least one coil or channel through which at least a portion of the fluid is moved.

15. An apparatus according to claim 14, wherein the coil or channel is movable with respect to the chamber.

16. An apparatus according to claim 15, further including a substrate for holding the coil or channel.

17. An apparatus according to claim 9, wherein the means for exposing includes at least one coil or channel held by a substrate, wherein at least a portion of the fluid is moved through the coil or channel.

18. An apparatus according to claim 17, further including means for supporting the substrate within the chamber.

19. An apparatus according to claim 18, wherein the means for supporting the substrate movably supports the substrate with respect to the chamber.

20. A method for liberating gas from gas hydrates, comprising:

passing a fluid through a coil or channel that extends adjacent to or into gas hydrates;

moving the coil or channel to maintain it in close proximity to or in contact with the gas hydrates, and optionally ejecting the fluid into the gas hydrate from the moving coil or channel; and exposing gas hydrates to heat from the fluid so as to dissociate the gas hydrates into a gas component and a water component.

21. A method according to claim 20, wherein the fluid includes steam.

22. A method according to claim 21, wherein steam enters a first end of the coil or channel, and a condensate is removed at a second end of the coil or channel.

23. A method according to claim 21, wherein steam enters a first end of the coil or channel, and at least a portion of the steam exits the coil or channel through at least one opening provided therein.

24. A method according to claim 21, wherein steam enters a first end of the coil or channel, steam enters a second end of the coil or channel, and at least a portion of the steam exits the coil or channel through at least one opening provided therein.

25. A method according to claim 20, further including collecting at least a portion of the gas component.

26. A method according to claim 20, further including removing at least a portion of the water component from the gas hydrates.

27. A method according to claim 20, wherein the fluid enters a first end of the coil or channel, and the fluid or a condensate of the gas is removed at a second end of the coil or channel.

28. A method according to claim 27, wherein at least a portion of the fluid exits the coil or channel through at least one opening provided therein.

29. A method according to claim 20, wherein a first portion of the fluid enters a first end of the coil or channel, a second portion of the fluid exits the coil or channel through at least one opening provided therein.

30. A method according to claim 20, wherein at least a portion of the fluid directly contacts the gas hydrates.

31. A method according to claim 20, wherein the fluid does not directly contact the gas hydrates.

32. An apparatus for liberating gas from a gas hydrate, comprising:

a heat exchanger for exposing gas hydrates to heat from a fluid to dissociate the gas hydrates into a gas component and a water component; and an arrangement in the apparatus for moving at least a portion of the fluid through the heat exchanger wherein the heat exchanger for exposing gas hydrates to heat is movable with respect to the gas hydrates and optionally adapted for ejecting the fluid into the gas hydrates.

33. An apparatus according to claim 32 wherein the fluid includes steam.

34. An apparatus according to claim 32 wherein the heat exchanger for exposing includes at least one opening for ejecting into the gas hydrates at least a portion of the fluid from the heat exchanger into the gas hydrate.

35. An apparatus according to claim 34 wherein a nozzle is included in the opening for ejecting at least a portion of the fluid.

36. An apparatus according to claim 32 wherein the heat exchanger includes at least one coil or channel through which at least a portion of the fluid is moved by the arrangement for moving.

37. An apparatus according to claim 36 wherein the coil or channel and the gas hydrates are movable with respect to one another.

38. An apparatus according to claim 36, further including a substrate for holding the coil or channel.

39. An apparatus according to claim 38, wherein the substrate is movably supported with respect to the gas hydrates.

40. The apparatus of claim 32 wherein the arrangement for moving at least a portion of the fluids comprises either the fluid under pressure, a gravity feed arrangement, or a pump.

41. An apparatus for holding gas hydrates and liberating gas from the gas hydrates comprising a chamber for holding gas hydrates; and a heat exchanger for exposing the gas hydrates to heat from a fluid to disassociate the gas hydrates into a gas component and a water component wherein the heat exchanger is at least partially provided within the chamber; and wherein the heat exchanger is movable with respect to the gas hydrates and optionally adapted for ejecting the fluid into the gas hydrates.

42. An apparatus according to claim 41 wherein the fluid includes steam.

43. An apparatus according to claim 41 further including an arrangement for moving at least a portion of the fluid through the heat exchanger.

44. An apparatus according to claim 41 wherein the heat exchanger includes at least one opening for ejecting at least a portion of the gas or liquid into the gas hydrates from the heat exchanger.

45. An apparatus according to claim 44 wherein a nozzle is included in the opening for ejecting the gas or liquid.

46. An apparatus according to claim 41 wherein the heat exchanger includes at least one coil or channel through which at least a portion of the fluid is moved.

47. An apparatus according to claim 41 further including a substrate for holding the coil or channel.

48. An apparatus according to claim 41 wherein the heat exchanger includes at least one coil or channel held by a substrate wherein at least a portion of the fluid is moved through the coil or channel.

49. An apparatus according to claim 48 further including a support for the substrate within the chamber.

50. An apparatus according to claim 49 wherein the support for the substrate movably supports the substrate with respect to the chamber.

51. The apparatus according to claim 43 wherein the arrangement for moving at least a portion of the fluid through the heat exchanger comprises either fluid under pressure, a gravity feed, or a pump.

* * * * *